United States Patent [19]

Bort

[11] Patent Number: 5,752,741
[45] Date of Patent: May 19, 1998

[54] BACK CUSHION WITH A DIMENSIONALLY STABLE SUPPORT PLATE

[75] Inventor: Rudi Bort, Weinstadt-Benzach, Germany

[73] Assignee: Bort GmbH, Weinstadt-Benzach, Germany

[21] Appl. No.: 786,449

[22] Filed: Jan. 21, 1997

[30] Foreign Application Priority Data

Nov. 5, 1996 [DE] Germany .................. 296 19 129 U

[51] Int. Cl.⁶ ...................................... A47C 7/48
[52] U.S. Cl. .............................. 297/284.5; 297/284.7
[58] Field of Search ..................... 297/284.4, 284.7, 297/284.5

[56] References Cited

U.S. PATENT DOCUMENTS

| | | | |
|---|---|---|---|
| 2,060,298 | 11/1936 | Gailey | 297/284.5 X |
| 3,762,769 | 10/1973 | Poschl | 297/284.4 |
| 4,159,847 | 7/1979 | Arai | 297/284.4 |
| 4,350,388 | 9/1982 | Weiner | 297/284.5 X |
| 4,632,454 | 12/1986 | Naert | 297/284.7 X |
| 4,722,569 | 2/1988 | Morgenstern et al. | 297/284.7 |
| 5,344,211 | 9/1994 | Adat et al. | 297/284.5 X |

*Primary Examiner*—Peter M. Cuomo
*Assistant Examiner*—Stephen Vu
*Attorney, Agent, or Firm*—Evenson, McKeown, Edwards & Lenahan, P.L.L.C.

[57] ABSTRACT

A back cushion with a form-stable support plate having a plurality of elastically deformable support tongues distributed over its surface. A manually adjustable support strip is located between the support tongues and the support plate. The support strip includes a polyhedral support body the circumference of which is formed by at least three outer surface pairs, each of which has two supporting surfaces located on opposite sides of the support body and are at least essentially parallel to one another. One supporting surface is supported at the support plate while the opposite supporting surface is supported at the support tongues respectively. The opposite supporting surfaces are each located at different distances from one another, and the support body is mounted to rotate around a lengthwise axis in such a manner that, depending on the effective position of the supporting surfaces, different distances of the support tongues with respect to the support plate are obtained.

16 Claims, 2 Drawing Sheets

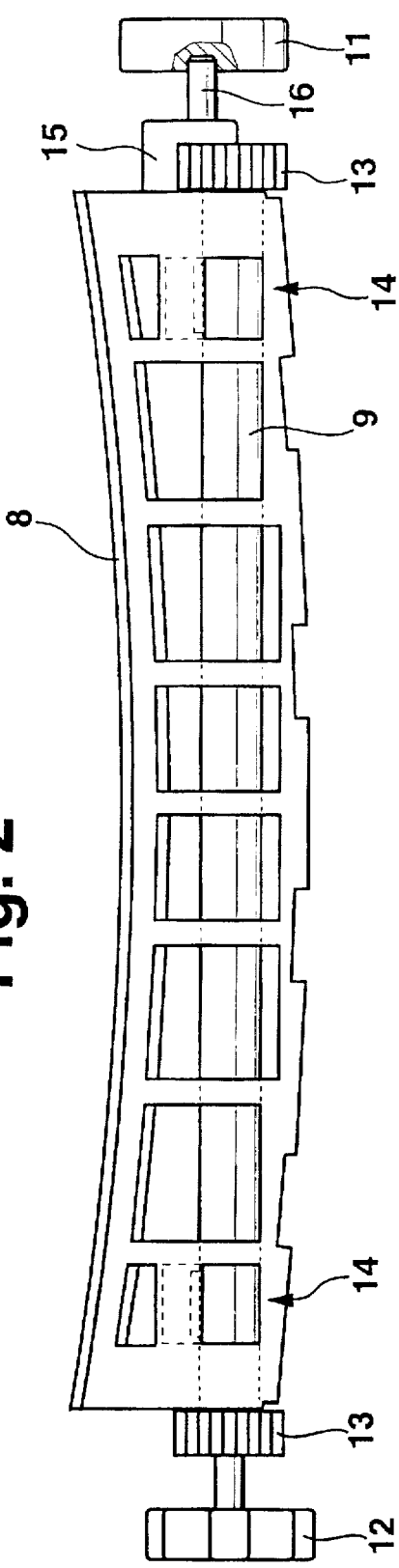
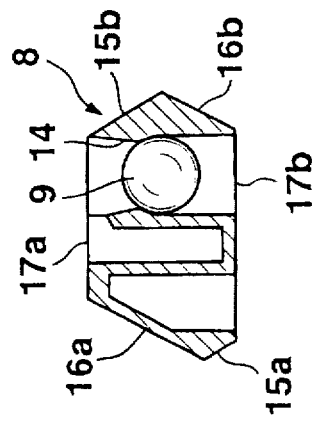
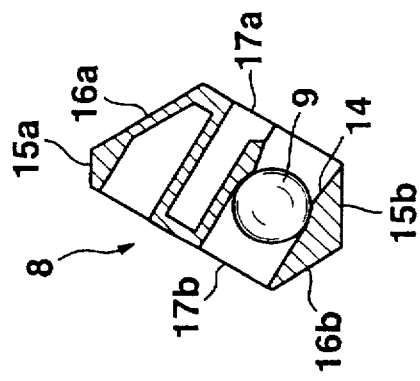

BACK CUSHION WITH A DIMENSIONALLY STABLE SUPPORT PLATE

BACKGROUND AND SUMMARY OF THE INVENTION

The invention relates to a back cushion with a support plate with a plurality of elastically deformable support tongues distributed over its surface, parallel to and along the support plate, said tongues being retained in opposite end areas of the support plate, with a support strip extending transversely to the support tongues over the width of the support plate and being located between the support tongues and the support plate, with the support tongues being deployed and curved arcwise by said strip, and with the support strip being adjustable heightwise along the support plate between the support tongues and the support plate by means of a manually operable toothed drive.

A back cushion of this type is known. The known back cushion has a dimensionally stable support plate over whose length a plurality of elastic support tongues arranged parallel to one another extend, said tongues being tilted arcwise by a support strip located between the support plate and the support tongues. The support mechanism formed by the support plate, the support tongues, and the support strip is integrated into a cushion cover for the back cushion, with a foam cushion being inserted between the support tongues and the cushion cover, said cushion serving to upholster the back cushion. The support strip constitutes a shaft at whose opposite end areas a pinion is formed that meshes at each end with a corresponding rack extending along the support plate. This support strip in the form of a shaft is rotatable by means of a knob, producing a heightwise displacement of the support strip along the support plate, causing the curved support tongues to be deployed into various positions heightwise.

A goal of the invention is to provide a back cushion of the type generally described above in which depthwise adjustability of the support tongues and hence of the back cushion can be achieved by simple means.

This and other goals have been achieved according to the present invention by providing a support strip with a polyhedral support body whose circumference is formed by at least three external surface pairs, each of which has two support surfaces on opposite sides of the support body, said pairs being at least essentially parallel to one another, with one support surface abutting the support plate and the opposite support surface abutting the support tongues, and with the opposite support surfaces each being located at different distances from one another, and the support body being rotatably mounted to rotate around the support body in such fashion that different distances of the support tongues from the support plate result depending on the effective position of the support surfaces. In this way, an at least triple depthwise adjustability of the back cushion is simply achieved, with the support body causing the support tongues to project to different degrees by rotating around its lengthwise axis. This depthwise adjustability can be produced at extremely low expense, since only an extremely small number of components is required. Preferably the lengthwise axis is mounted eccentrically with respect to a center-of-gravity axis of the support body.

According to one preferred embodiment of the present invention, the support strip has an adjusting shaft provided with the toothed drive, extending across the width of the support plate and displaceable heightwise along the latter, said shaft being aligned coaxially with the rotational axis of the support body and with the support body rotatably mounted thereon. The adjusting shaft and the support body thus form a compact module that ensures both heightwise and depthwise adjustability of the effective displacement areas of the support tongues for the back cushion.

In another embodiment of the invention, the support surfaces of the outer surface pairs facing the support tongues are given a concave curvature that extends over the length of the support body. As a result of this concave curvature, the displacement areas of the support tongues are also given a correspondingly concave curvature across the width of the back cushion, resulting in improved adaptation to the corresponding back areas of the person using the back cushion.

In another embodiment of the invention, the support body is provided at one end with a handle for manual rotation. As a result, the support body can be moved laterally in simple fashion from the outside into its different depthwise positions.

In another embodiment of the invention, the support body and adjusting shaft are each made in one piece from plastic. This is an especially economical design.

In another embodiment of the invention, the support body is releasably locked to the adjusting shaft by means of a locking connection. As a result, no additional mounting or bearing elements are required.

Other objects, advantages and novel features of the present invention will become apparent from the following detailed description of the invention when considered in conjunction with the accompanying drawings.

BRIEF DESCRIPTION OF THE DRAWINGS

FIG. 2 shows the support strip of the back cushion in FIG. 1, including a support body and an adjusting shaft;

FIG. 3 shows a cross section of the support body in FIG. 2 in a first depthwise position;

FIG. 4 shows a cross section of the support body according to FIG. 2 in a second depthwise position; and FIG. 5 shows a cross section of the support body according to FIG. 2 in a third depthwise position.

DETAILED DESCRIPTION OF THE DRAWINGS

Figure 1:
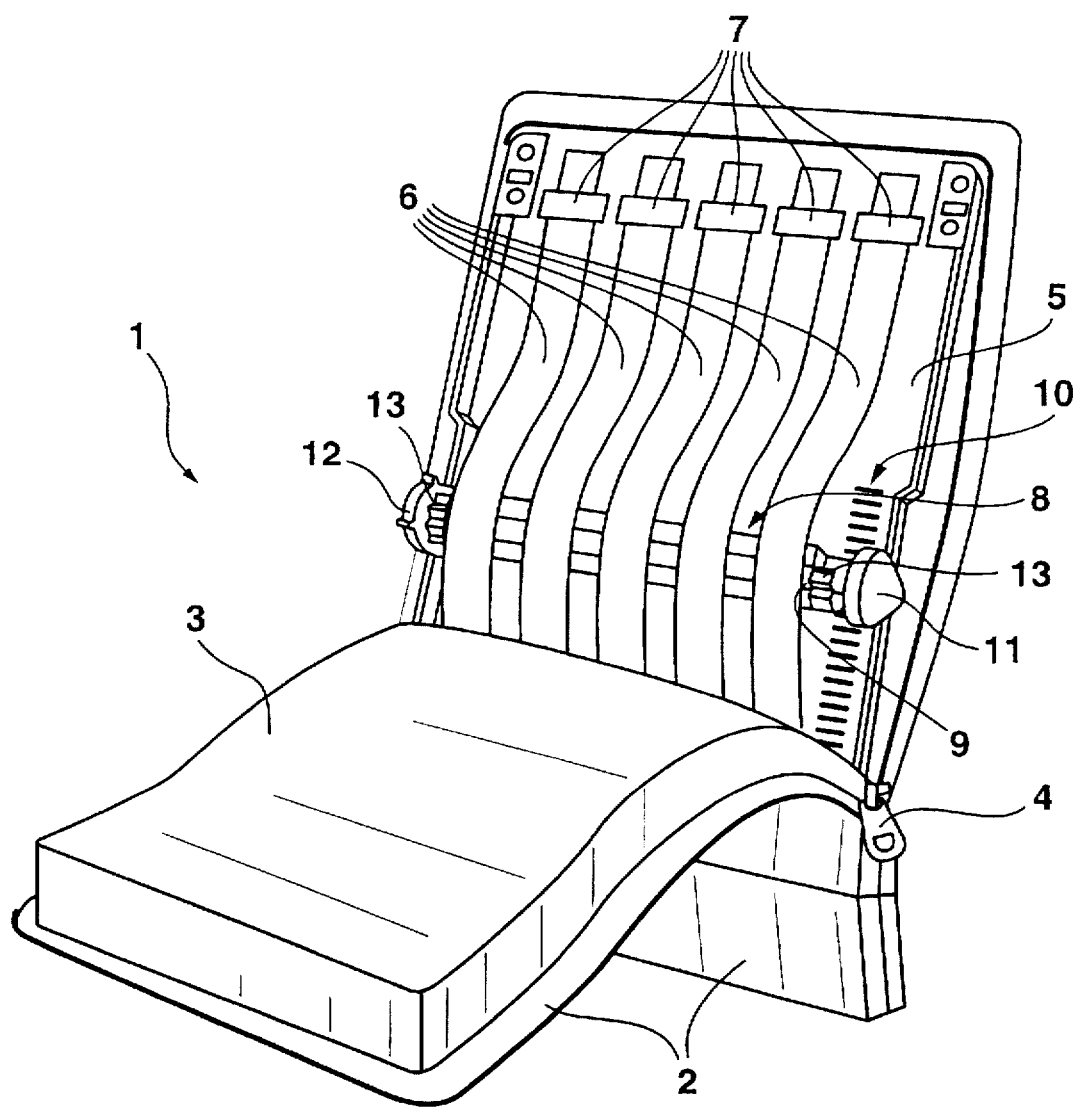
FIG. 1 is a perspective view of a back cushion according to a preferred embodiment of the present invention in the unzipped state.

A back cushion 1 as shown in FIG. 1 has a cushion cover 2 which can be opened by means of a slide fastener 4. Inside, a foam cushion 3 is provided on a side of cushion cover 2 that faces the person leaning against back cushion 1, said foam cushion 3 being adjusted to the dimensions of cushion cover 2. The support function of back cushion 1 is performed by a support mechanism described in greater detail below.

The support mechanism comprises an at least largely dimensionally stable support plate 5 that is likewise adapted to the dimensions of cushion cover 2 in such fashion that it generally fills the interior of cushion cover 2 over both the length and width of cushion cover 2. Support plate 5 is made of a dimensionally stable plastic. Support plate 5 has five bearing loops 7 located side by side in its upper end area as well as in its lower end area on the side facing foam cushion 3, into which loops five elastic support tongues 6 are inserted, said tongues extending parallel to one another over the length of support plate 5. Support tongues 6 are elastically deformable and are deployed by a support strip 8, 9 in a deployment area by an arched curvature in the direction of foam cushion 3. The deployment area of support tongues 6 can be displaced heightwise along support plate 5, with support strip 8 being displaced along support plate 5 by means of a toothed drive in the form of a rack-and-pinion drive 10, 13, as further described below.

The support strip located between support tongues 6 and support plate 5 is composed of an adjusting shaft 9 and a polyhedral support body 8 each of which is made in one piece from a dimensionally stable plastic. Support body 8 provides support for support tongues 6 and for support plate 5 at the back and is displaceable heightwise by means of adjusting shaft 9 along support plate 5 within the limits of the rack-and-pinion drive described in greater detail below. Polyhedral support body 8 (FIGS. 2 to 5) is made in one piece from plastic and extends over the entire width of support tongues 6 when they are mounted in position on support plate 5 (FIG. 1). The circumference of support body 8 is formed by three outer surface pairs 15a, 15b; 16a, 16b; 17a, 17b, with each outer surface pair being formed of two support surfaces 15a, 15b; 16a, 16b, 17a, 17b, located opposite and parallel to one another. Support surfaces 15a to 17b each have different widths.

Support surfaces 15a, 16a, 17a have a uniform concave curvature over the length of support body 8. The corresponding support surfaces 15b, 16b, 17b are accordingly curved convexly in the embodiment shown. These support surfaces 15b to 17b can also be made flat, however. Support surfaces 15a to 17a abut the undersides of support tongues 6. Support surfaces 15b, 16b, 17b, on the other hand, abut the top of support plate 5 at the rear. Support body 8 has a groove-like depression extending over its length, said depression running eccentrically but axially parallel to a center-of-gravity axis of support body 8. Adjusting shaft 9 is accommodated in this depression, said shaft being made cylindrical. Adjusting shaft 9 is clipped in simple fashion in the groove-shaped depression. For this purpose, support body 8 has a pair of locking noses 14 in the vicinity of two bearing points provided on opposite end sections of support body 8, said noses holding adjusting shaft 9 in the locked position. Adjusting shaft 9 is mounted so that it can rotate in support body 8 around the eccentric lengthwise axis of said body.

Adjusting shaft 9 has a pinion 13 molded in one piece at each of its ends, said pinions flanking the opposite ends of support body 8. These pinions 13 mesh with two rows of teeth 10 molded integrally on the top of adjusting plate 5 in its lateral marginal areas and extending over a central area of support plate 5 (FIG. 1). On the side at the left in FIGS. 1 and 2, an adjusting knob 12 is molded on adjusting shaft 9, said knob being connected with pinion 13 by a shaft extension, not shown in greater detail. The nonrotational connection of adjusting knob 12 to adjusting shaft 9 ensures that rotation of adjusting knob 12 causes a heightwise displacement of adjusting shaft 9 along support plate 5 and thus also a lengthwise displacement of support body 8 along support plate 5.

Support body 8 is rotatable stepwise around the central lengthwise axis of adjusting shaft 9, said axis also forming the rotational axis of adjusting shaft 9. Since the central lengthwise axis of adjusting shaft 9, around which support body 8 is rotatable, is located eccentrically within support body 8, rotation of support body 8 around adjusting shaft 9 also simultaneously produces different distances of support tongues 6 from the top of support plate 5. In order to avoid a lifting of support shaft 9, and especially of pinions 13, from tooth rows 10 in the various rotational positions of support body 8, thus ruling out heightwise adjustability, the distances of the three support surfaces 15b, 16b, and 17b that abut support plate 5 are all identical to the central lengthwise axis of adjusting shaft 9. Only the distances of support surfaces 15a, 16a, and 17a from the lengthwise axis differ from one another, said surfaces abutting the underside of support tongues 6, so that the various adjustment positions for the depth of back cushion 1 can be achieved. Depending on whether support surface 15a, support surface 16a, or support surface 17a abuts support tongues 6, different distances of support tongues 6 from support plate 5, and hence a different arcuate curvature of support tongues 6, result. Consequently, different depths, divided into three stages, are achieved for back cushion 1, and produce different supporting effects on the back of a person using back cushion 1. Support body 8 is rotated counterclockwise out of the position shown in FIG. 3 until support surface 16b rests flush against support plate 5. Stable supporting positions in all three depth positions are produced by the flat shape and edgewise transitions between the individual support surfaces in each case.

Support body 8 must always be pivoted only far enough that one of support surfaces 15b, 16b, or 17b abuts support plate 5, since it is only in these positions that engagement of pinions 13 with tooth rows 10 is ensured. In these positions, depending on the depth position set, a height adjustment is also achieved, in other words a lengthwise displacement of support body 8 along support plate 5.

In order to be able to rotate support body 8 manually in simple fashion into its various positions, a retaining bridge 15 molded in one piece projects from the end of support body 8 opposite adjusting knob 12, said bridge fitting over pinion 13 and making a transition to an outwardly projecting extension 16 on which a knob 11 is stably mounted. Rotation of knob 11, because of its rigid connection with retaining bridge 15 and hence also with support body 8, causes rotation of support body 8 into the desired depth position.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A back cushion, comprising:

a support plate;

a plurality of elastically deformable support tongues distributed over a surface of the support plate, said tongues being parallel and extending longitudinally along the support plate, said tongues being retained proximate opposite ends of the support plate; and a support strip extending transversely with respect to the support tongues over a width of the support plate, said support strip being located between the support tongues and the support plate, the support tongues being curved in an arcuate fashion when deployed, and the support strip being adjustable heightwise along the support plate by way of a manually operable toothed drive between the support tongues and the support plate, wherein the support strip has a polyhedral support body with a circumference formed by at least three outer surface pairs, each of the outer surface pairs having two support surfaces located on opposite sides of the support body and at least essentially parallel to one another, one of the support surfaces abutting the support plate and the opposite support surface abutting the support tongues, a distance between the opposite support surfaces of each outer surface pair being different from that of other of the outer surface pairs, and the support body being rotatable around a longitudinal axis such that different of said outer surface pairs engage the support tongues and the support plate.

2. A back cushion according to claim 1, wherein the support strip has a support shaft provided with the toothed drive, the support strip extending transversely across the width of the support plate, said shaft being aligned coaxially with the longitudinal axis of the support body, and the support body being rotatably mounted on the shaft.

3. A back cushion according to claim 1, wherein the support surfaces of the outer surface pairs which face the support tongues have a concave curvature that extends over the length of the support body.

4. A back cushion according to claim 1, wherein the support body is provided at one end with a knob for manual rotation.

5. A back cushion according to claim 2, wherein the support body is provided at one end with a knob for manual rotation.

6. A back cushion according to claim 1, wherein the support body and the adjusting shaft are each made in one piece from plastic.

7. A back cushion according to claim 2, wherein the support body and the adjusting shaft are each made in one piece from plastic.

8. A back cushion according to claim 6, wherein the support body is releasably locked to the adjusting shaft by means of a locking connection.

9. A back cushion according to claim 2, wherein said toothed drive comprises two rows of teeth provided on the support plate, and two pinions molded in one piece with said support shaft, said pinions being engageable with respective of said rows of teeth.

10. A back cushion comprising:

a support plate;

a plurality of support tongues each being attached to said support plate proximate opposite longitudinal ends of the support plate;

a support strip arranged between the support tongues and the support plate, extending transversely to the support tongues over a width of the support plate, and having an axis of rotation;

a manually operable toothed drive operatively connected to the support strip to adjust the support strip along the longitudinal length of the support plate;

wherein the support strip comprises a polyhedral support body with a circumference formed by at least two outer surface pairs, each of the outer surface pairs having a first support surface for selective engagement with the support tongues and a second support surface located opposite said first support surface for selective engagement with the support plate, a distance between said first support surface and said second support surface being different for each respective outer surface pair, said support strip being rotatable about said axis of rotation to selectively engage one of the second support surfaces with the support plate and a respective of the first surfaces with the support tongues.

11. A back cushion according to claim 10, wherein said first support surfaces are each located at a different respective distance from the axis of rotation of the support strip.

12. A back cushion according to claim 10, wherein said second support surfaces are each located at an identical distance from the axis of rotation of the support strip.

13. A back cushion according to claim 11, wherein said second support surfaces are each located at an identical distance from the axis of rotation of the support strip.

14. A back cushion according to claim 10, wherein the first support surfaces of the outer surface pairs comprise a concave curvature that extends over the length of the support body.

15. A back cushion comprising:

a support plate;

at least one support tongue arranged in a longitudinal direction with opposite longitudinal ends being fixed relative to said support plate;

a support body arranged between and in engagement with each of the at least one support tongue and the support plate, said support body extending in a transverse direction relative to said longitudinal direction, said support body having at least two oppositely facing outer surface pairs extending in said transverse direction, said at least two outer surface pairs defining a polyhedral cross-section such that respective distances between said outer surface pairs are different, said support body being rotatable to engage a selective of said outer surface pairs with said support tongue and said support plate.

16. A back cushion according to claim 15, further comprising a toothed drive operatively connected to the support body to adjust the support body in said longitudinal direction.

* * * * *